(12) United States Patent
Curtis et al.

(10) Patent No.: US 8,776,731 B1
(45) Date of Patent: Jul. 15, 2014

(54) CANINE ODOR RECOGNITION TRAINING SYSTEM

(76) Inventors: Paul E. Curtis, Loudon, TN (US); Gary A. Arden, Lenoir City, TN (US)

(*) Notice: Subject to any disclaimer, the term of this patent is extended or adjusted under 35 U.S.C. 154(b) by 397 days.

(21) Appl. No.: 12/781,457

(22) Filed: May 17, 2010

(51) Int. Cl.
*A01K 15/00* (2006.01)

(52) U.S. Cl.
USPC ............................... 119/720; 119/712

(58) Field of Classification Search
USPC ........... 119/712, 449, 454, 475, 51.01, 51.02, 119/51.11–51.15, 52.3–56.1, 720
See application file for complete search history.

(56) References Cited

U.S. PATENT DOCUMENTS

| | | | |
|---|---|---|---|
| 6,382,070 B1 | 5/2002 | Garcia et al. | |
| 6,571,743 B1* | 6/2003 | Curry | 119/720 |
| 6,843,158 B2 | 1/2005 | Garcia et al. | |
| 7,334,541 B2 | 2/2008 | Reiter | |
| 7,654,230 B2* | 2/2010 | Kroll | 119/712 |
| 7,866,279 B2* | 1/2011 | Lucken | 119/51.12 |
| 2005/0061252 A1* | 3/2005 | Meeks et al. | 119/51.02 |
| 2007/0068459 A1* | 3/2007 | Lucken | 119/51.12 |

FOREIGN PATENT DOCUMENTS

| | | |
|---|---|---|
| DE | 102008009239 | 8/2009 |
| SE | 525129 | 12/2004 |

* cited by examiner

*Primary Examiner* — Kristen C Hayes
(74) *Attorney, Agent, or Firm* — Luedeka Neely Group, P.C.

(57) ABSTRACT

An odor recognition training system for use in training an animal to recognize a desired odor, the system including an odor enclosure configured to receive an odor source within an odor storage area, a reward within a reward storage area, and an odor retention zone adjacent to and in fluid communication with the odor storage area; and a reward release system associated with the desired odor enclosure is remotely operable by the trainer for dispensing the reward directly to the odor retention zone.

10 Claims, 5 Drawing Sheets

CANINE ODOR RECOGNITION TRAINING SYSTEM

FIELD

This disclosure relates to the field of animal training devices. More particularly, this disclosure relates to a system for training of animals, such as dogs, to recognize desired odors and to disassociate other odors and distractions.

BACKGROUND

Various approaches are used to train animals, such as dogs, to detect specific drugs, such as marijuana, or explosives, or other items having an odor that can be detected by an animal, such as a dog. Training typically involves a trainer exposing the animal to an odor and rewarding the animal when the animal responds to the odor.

Conventional training systems typically require the trainer to approach the source of the odor to dispense the reward to the dog. This typically disassociates the dog from the odor in that the trainer is approaching or otherwise interacting with the dog. This involvement of the trainer tends to disadvantageously associate the reward with the trainer rather than the odor.

Conventional training also typically involves some delay from the time the dog reacts to the odor and the time the reward is provided to the dog. This delay often results in the dog scratching the source of the odor. As will be appreciated, essentially training a dog to scratch can have detrimental results in the case of dogs trained to sniff explosives.

Accordingly, improvement is desired in the training of animals, such as dogs, to recognize odors and to disassociate other odors and distractions.

The present disclosure advantageously provides a canine (or other animal) odor recognition training system that overcomes shortcomings associated with conventional training systems.

SUMMARY

The above and other needs are met by an odor recognition training system for use in training an animal to recognize a desired odor.

In a preferred embodiment, the system includes a first enclosure configured to receive an odor source within an odor storage area, a reward within a reward storage area, and an odor retention zone adjacent to and in fluid communication with the odor storage area.

The system also includes a reward release system associated with the desired odor enclosure. The release system is remotely operable by a trainer for dispensing the reward directly from the reward storage area to the odor retention zone for retrieval by the animal

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
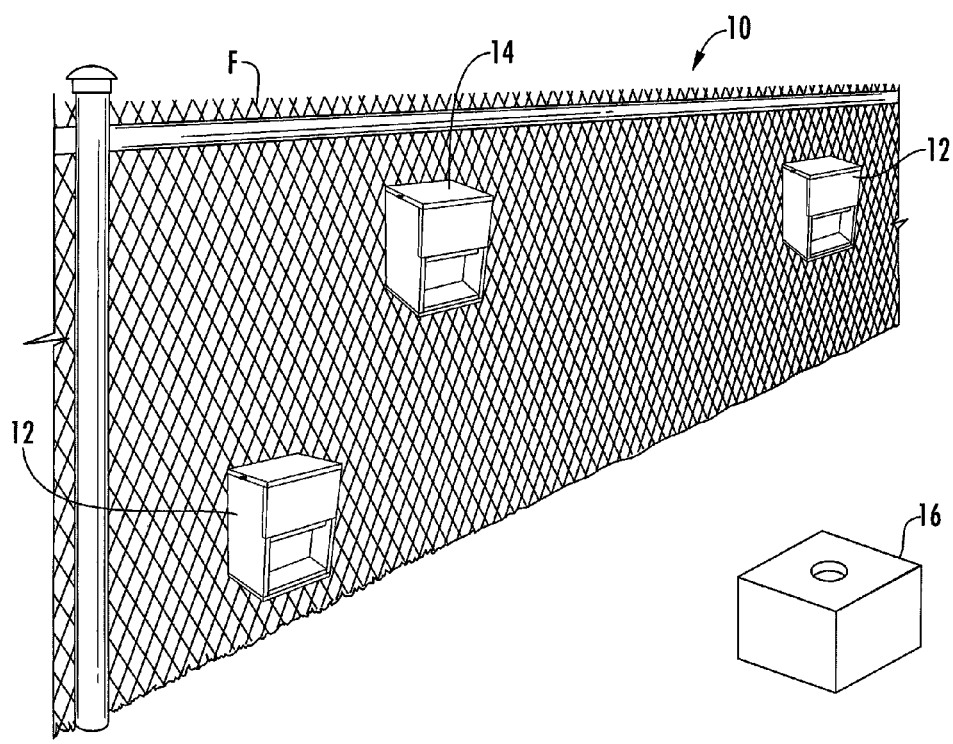
FIG. 1 is a perspective view of an odor recognition training system according to the disclosure.
Figure 2:
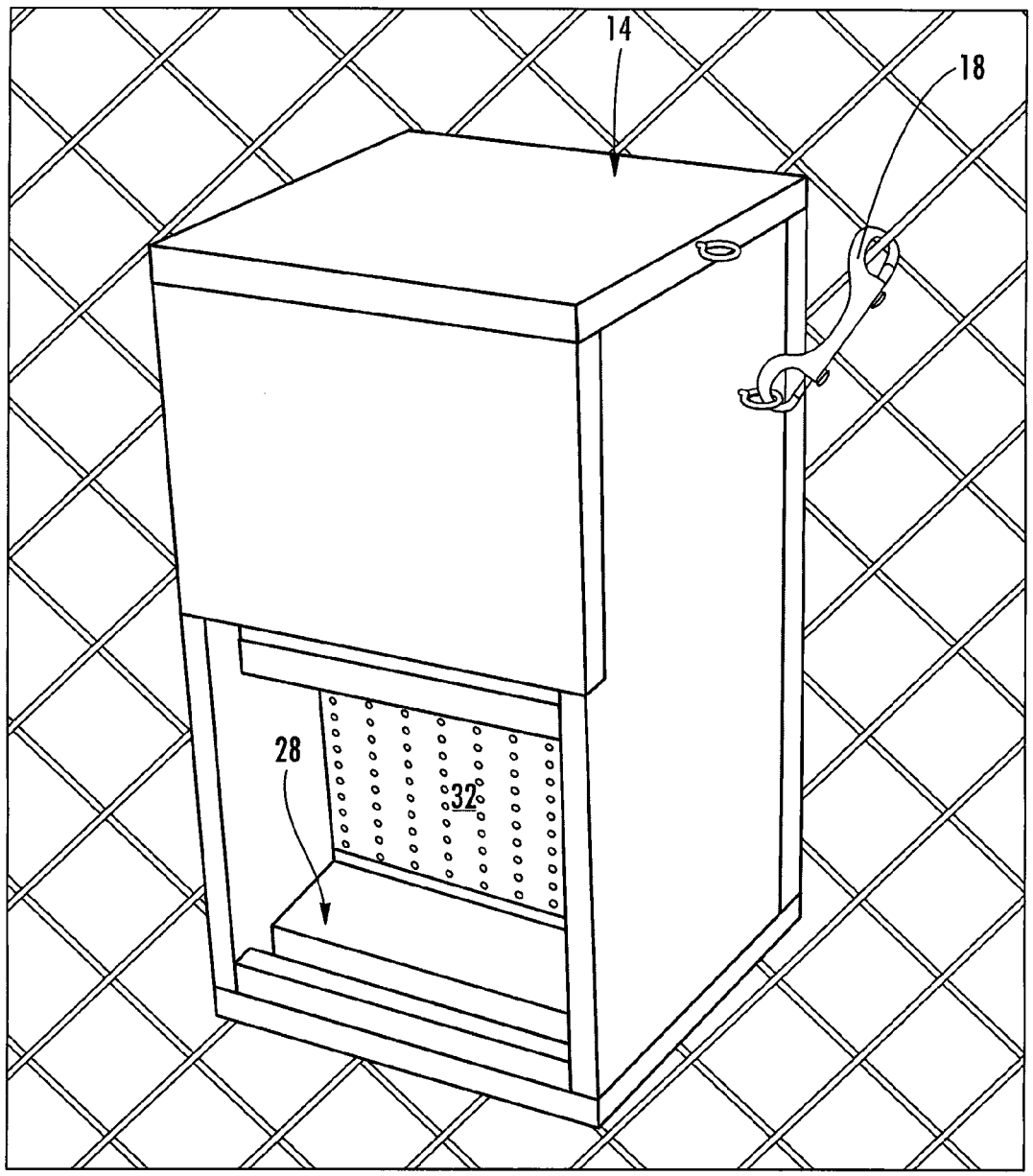
FIG. 2 is a closeup view of an enclosure of the system that contains a desired training odor.
Figure 3:
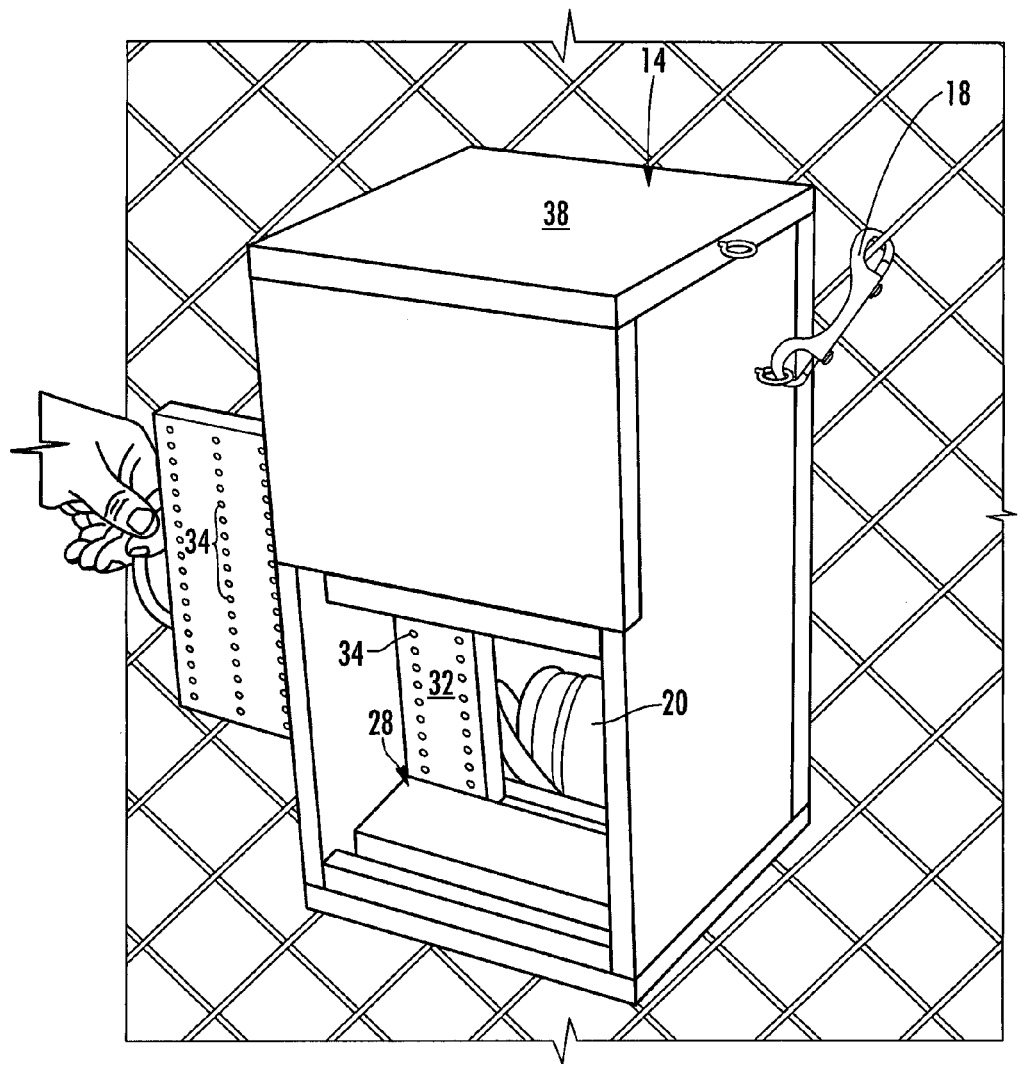
FIG. 3 shows an odor storage area of the enclosure of FIG. 2.
Figure 4:
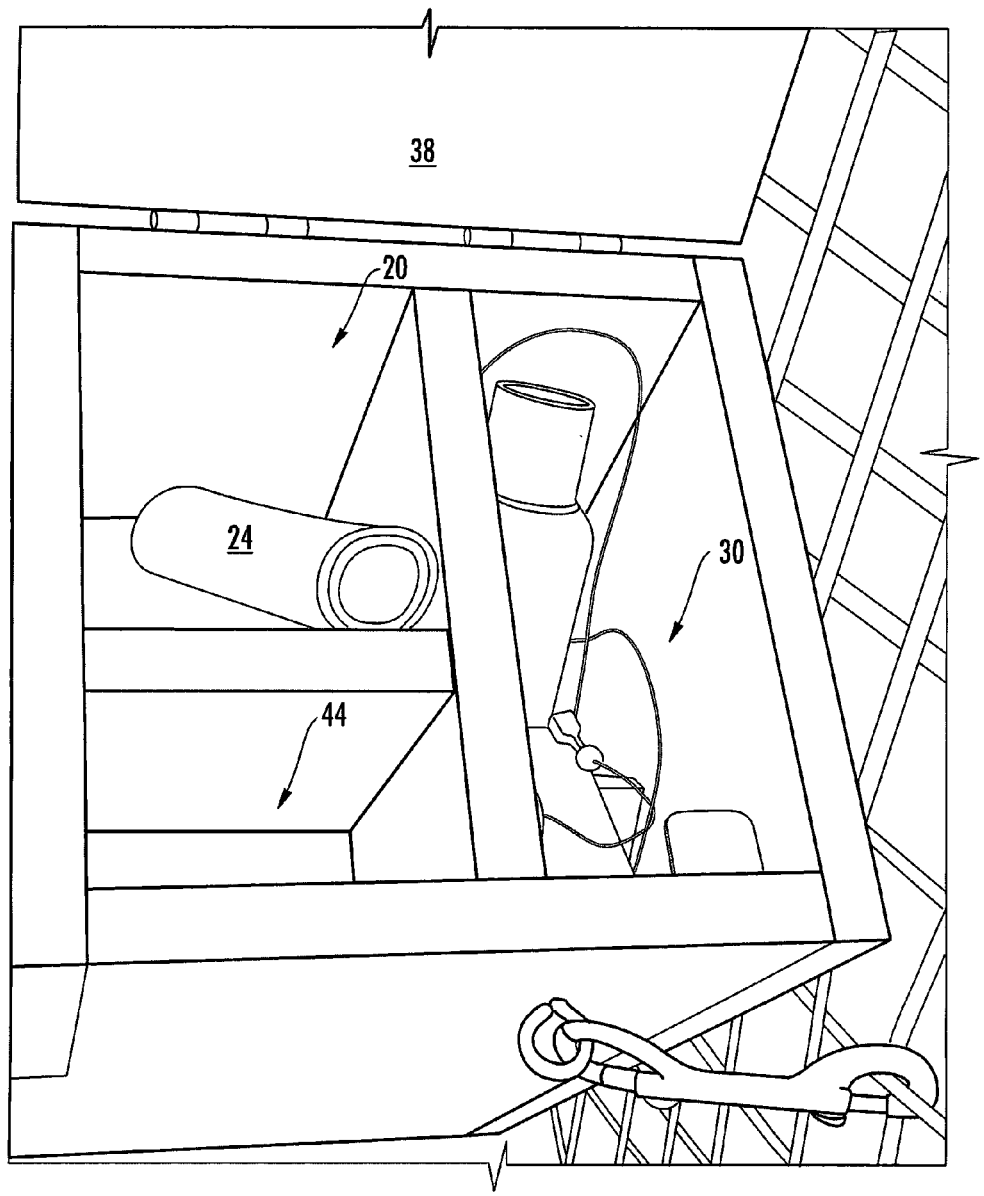
FIG. 4 shows a reward within a reward storage area, and a reward release system of the enclosure of FIG. 2.

With reference to the drawings, the disclosure relates to a canine odor recognition system 10 configured to facilitate the training of animals, such as dogs, to identify a predetermined odor and to disassociate other odors and distractions. For example, the system 10 is particularly configured to facilitate training of dogs to detect a specific drug or explosive. As will be appreciated, other animals having a keen sense of smell may be trained using the system 10.

The system 10 advantageously allows a trainer to step away from an animal or animal group, such as a canine team, and observe both the dog handler and the dog. This remote positioning of the trainer relative to the dog (and the handler if present) gives a trainer the greatest possibility of ensuring the dog makes the proper association in his work. Accordingly, it will be appreciated that the system 10 provides a platform to assist a trainer to more accurately imprint the learned and instinctive behaviors associated with the detection work for which the animal is being trained.

The system 10 includes one or more decoy training enclosures 12 and at least one desired odor enclosure 14 that contains a desired training odor. A plurality of the enclosures 14 may be utilized if desired, and it is preferred to use a plurality of the decoy training enclosures 12. The enclosures 12 and 14 are each preferably visibly identical so that appearance does not serve to impact the response of the animal to the training odor. However, if desired, one or more decoy training enclosures may be visually distinguishable, such as is represented by decoy training enclosure 16.

The enclosures 12, 14, and 16 may be located at various different locations and configured for being supported by a support, such as a fence F, for placement at various heights, or they may be placed on the ground. For example, snaps 18 may be used to releasably attach the enclosures to the fence F. This cultivates a working relationship between the animal and the handler to work with the animal to inspect enclosures regardless of their location. In this regard, it will be understood that the enclosures 12, 14, and 16 are lightweight and portable and may be placed indoors or outdoors and are easily moved to different locations.

With reference to FIGS. 2-5, the enclosure 14 is configured to receive an odor source 20 within an odor storage area 22, a reward 24 within a reward storage area 26, and an odor retention zone 28 adjacent to and in fluid communication with the odor storage area 22. In addition, a reward release system 30 associated with the enclosure 14 is remotely operable by the trainer for dispensing the reward 24 directly to the odor retention zone 28.

Using the decoy training enclosures 12, and optionally 16, loaded with distracting odors, in concert with the desired odor enclosures 14 is advantageous to ensure the animal is responding to the precise odor signature that is desired. For example, a decoy training enclosure 12 may be loaded with tennis balls and a desired odor enclosure 14 contains an odor source 20 and a reward 24. Both of these enclosures would be placed in the exercise for the animal to sniff. The handler/trainer would ensure the animal sniffs the decoy training enclosure 12 and would admonish the animal if the animal responded to it (odor of tennis balls). When the animal sniffs the desired odor enclosure 14, the animal may smell the odor of the tennis balls, but will definitely smell a stronger odor of the odor source 20 due to the design of the odor retention zone 28 of the enclosure 14.

Accordingly, to ensure that the animal does not interact with an enclosure based upon any odor associated with the reward 24, other ones of the enclosures 12 and/or 16 which are enclosures not containing the desired training odor, may contain one or more of the rewards 24. The enclosures 12 and 16 may also contain other decoy distracting odors, such as rewards, animal pelts, and other items having an odor different from the training odor.

The dog or other animal being trained by use of the system 10 receives the reward 24 from the odor retention zone 28. The odor source 20 may be any source of odor that it is desired to train the animal to recognize. For example, illegal drugs, such as marijuana or cocaine, or explosives, such as plastic explosives.

The odor storage area 22 is a cavity within the enclosure 14 adjacent to the odor retention zone 28 and physically separated therefrom as by a sliding door 32. The use of the sliding door 32 facilitates easy placement of the odor source 20 within the storage area 22 and serves to visually and physically block the animal from the odor source 22. To place the odor retention zone 28 in fluid communication with the odor storage area 22, the door 32 includes a plurality of apertures 34 therethrough. The odor storage area 22 is configured to be large enough to hold a suitable amount of the odor source 20 to provide a desired amount of odor. For example, when initially training an animal, it may be desirable to use larger amounts of the odor source 22, and to gradually decrease the amount as the training progresses.

As will be observed, the construction of the enclosure 14 with the provision of the sliding door 32 enables easy introduction of the odor source 20 and easy cleanout of the odor source 20 from the enclosure 14 after use. This also allows for a good open air cleaning of the enclosure 14 to reduce retention of the odor source 20 after its removal so that the enclosure may subsequently be used with a different odor source 20. However, as a practical matter, it is preferred to dedicate particular ones of the enclosures 14 to a given odor source 20. Access to other portions of the enclosure 14 may be facilitated as by a hinged access lid 38. Other boundary portions of the enclosures, such as the sidewalls and the bottom may be rigidly secured to one another as by screws and the like.

The reward 24 is any object or objects that may be considered by the animal as a reward, such as a rubber or other toy, food, tennis ball, rubber pipe, cloth towel, food, animal parts or other object that is desirable to the animal and used to reinforce the detection training of a canine or other animal. The reward 24 to be provided to the animal may be a plurality of objects if desired, such as a ball and food.

Figure 5:
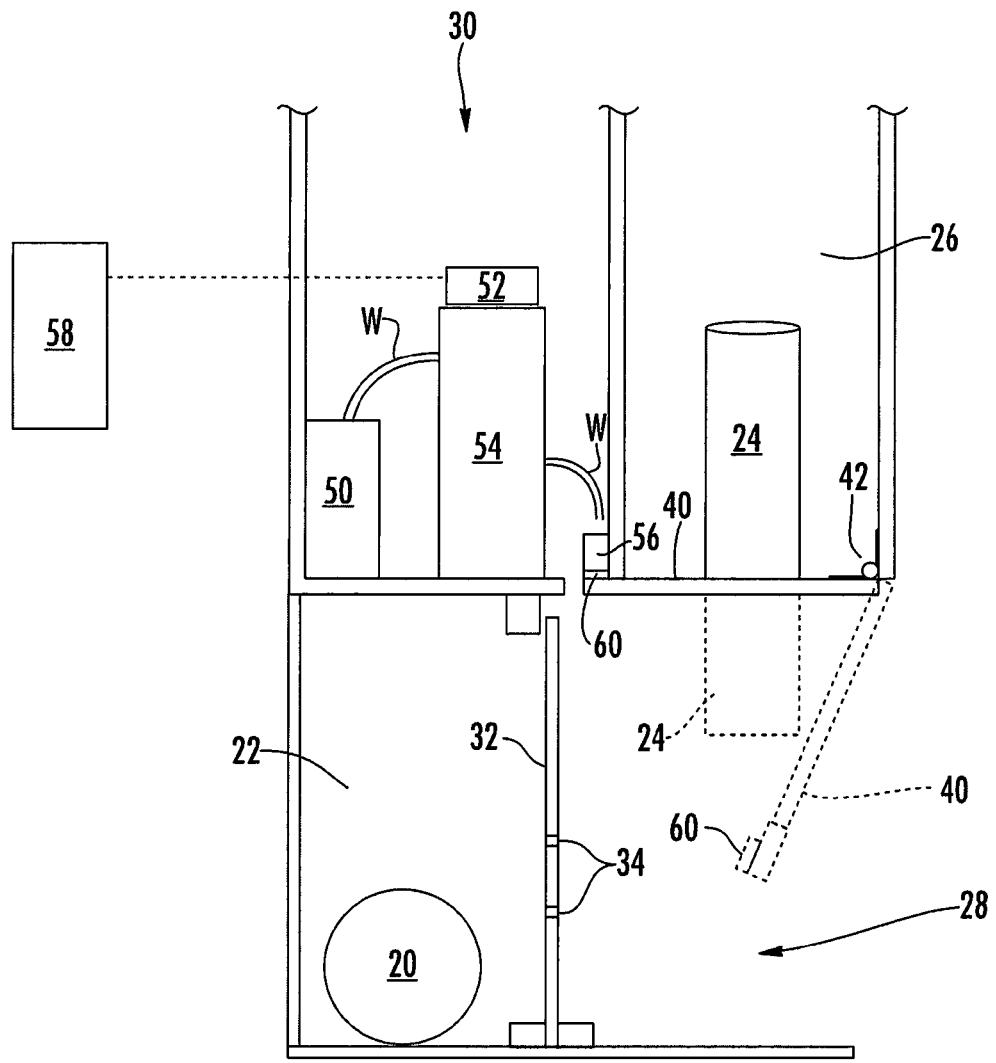
FIG. 5 is a cross-sectional view of the enclosure of FIG. 2.

The reward storage area 26 is isolated from the odor source 20 and the odor retention zone 28, but located so that activation of the reward release system 30 will result in the reward 24 being positioned within the odor retention zone 28. In this regard, the reward storage area 26 is preferably located directly above the odor retention zone 28 and vertically separated therefrom as by a trapdoor 40 or other selectively operable structure for placing the reward storage area 26 in relationship with the odor retention zone 28 so that the reward 24 may pass from the reward storage area 26 to the odor retention zone 28. The trapdoor 40 is manually set so as to separate the reward storage area 26 from the odor retention zone 28, but when the reward release system 30 is activated, the trapdoor 40 is released and rotates about a hinge 42 to drop the reward 24 under the force of gravity into the odor retention zone 28, as shown in FIG. 5. If space of the enclosure 14 allows, a supplemental storage area 44 may be provided for bulk storage of the rewards 24 or decoy odors or both, the supplemental storage area 44 not being configured to have a trapdoor or other structure for passing items therefrom to the odor retention zone 28.

The odor retention zone 28 is configured to collect odor escaping the odor storage area 22 via the apertures 34 and to provide an enlarged volume in which the odor (in the form of air containing the odor) may expand. Thus, the odor retention zone 28 tends to receive and retain odors from the odor storage area 22 and provide an enlarged volume of odor for the animal to sample than the animal can get from sniffing a flat surface. In this regard, the odor retention zone 28 provides a cavity in flow communication with the odor storage area 22, and providing an enlarged enclosed area open on a side, preferably opposite the odor storage area 22, to provide an access port sized to permit access of a nose and mouth of the animal to permit the animal to smell odor associated with the odor source 20 within the odor retention zone 28 and to permit the animal to retrieve the reward 24 from the odor retention zone 28 after the reward 24 has been dispensed into the odor retention zone 28.

The reward release system 30 includes structure associated with the enclosure 14 and remotely operable to cooperate with the reward storage area 26 for releasing the reward 24 therein into the odor retention zone 28. For example, the release system 30 may be a combination such as a battery 50, a receiver 52, a relay 54, and a magnetic latch 56, placed in electrical communication as by wires W. The receiver 52 is remotely operable as by a remote control transmitter 58. Thus, in operation, the transmitter 58 is operated by the trainer/handler to activate the receiver 52 and thereby operate the relay 54 to control the magnetic latch 56, which cooperates with a metal strip 60 on the trap door 40, to release the trap door 40 and drop the reward 24 into the odor retention zone 28.

If two or more of the enclosures 14 are utilized, the transmitter 58 may be configured to allow a trainer the ability to select the enclosure 14 he/she wants to activate at the appropriate time. Activating the reward release is instantaneous with the push of a button to operate the transmitter 58. The reward is thereby delivered by gravity without any mechanical movement of the reward 24 being required.

Advantages of the odor reinforcement training system 10 include (1) association of the training odor with the act of receiving a reward, (2) disassociation of the reward from the trainer, and (3) immediate connection of the reward to the odor in a manner that does not test the patience of the animal (usually a dog) and result in potentially undesirable behavior.

For example, a conventional training system typically requires the trainer to approach the source of the odor to dispense the reward to the dog. This typically disassociates the dog from the odor in that the trainer is approaching, associates the reward with the trainer, and the resulting delay often results in the dog scratching the enclosure in anticipation. As will be appreciated, essentially training a dog to scratch can have detrimental results in the case of dogs trained to sniff explosives. The system 10 is advantageously suited for initial training of an animal having no odor detection training. The system 10 is also well suited for maintenance training of animals having years of training and detection experience.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An odor recognition training system for use in training an animal to recognize a desired odor, the system comprising:
    a first enclosure including;
    an odor storage compartment configured to receive an odor source having a desired odor;
    an odor retention compartment adjacent to and in fluid communication with the odor storage compartment, the odor retention compartment being physically separated from the odor storage compartment by an apertured wall for visually and physically blocking the animal from the odor source while allowing fluid communication of the desired odor from the odor storage compartment to the odor retention compartment;
    a reward storage compartment isolated from the odor storage compartment and the odor retention compartment, the reward storage compartment configured to receive a reward different from the odor source; and
    a reward release system;
    associated with the desired odor within the first enclosure and being remotely operable by a trainer for dispensing the reward directly from the reward storage compartment to the odor retention compartment for retrieval by the animal once the trainer observes the animal has recognized the desired odor.

2. The system of claim 1, wherein the odor storage compartment is a cavity within the enclosure adjacent to the odor retention zone and physically separated therefrom.

3. The system of claim 1, wherein the reward storage compartment is located above the odor retention zone and vertically separated therefrom by a trapdoor, the trapdoor being operable to dispense the reward into the odor retention compartment.

4. The system of claim 1, wherein the odor retention compartment is configured to collect odor escaping the odor storage compartment and to provide an enlarged volume in which the odor may expand.

5. The system of claim 1, wherein the odor retention compartment comprises a cavity in flow communication with the odor storage compartment and configured to permit access of a nose and mouth of the animal to permit the animal to smell odor associated with the odor source within the odor retention compartment and to permit the animal to retrieve the reward from the odor retention compartment after the reward has been dispensed into the odor retention compartment.

6. The system of claim 1, wherein the release system comprises a receiver, a relay, and a magnetic latch, wherein the receiver is remotely operable.

7. The system of claim 6, wherein the reward storage compartment includes a trapdoor that cooperates with the release system, wherein the receiver is activated to operate the relay to control the magnetic latch to release the trap door and drop the reward into the odor retention compartment.

8. The system of claim 1, comprising a plurality of the first enclosures.

9. The system of claim 1, further comprising a second enclosure having a decoy odor different than the desired odor of the first enclosure.

10. The system of claim 9, wherein the second enclosure further includes a reward that is the same as the reward of the first enclosure.

* * * * *